US010203991B2

United States Patent
Brady et al.

(10) Patent No.: US 10,203,991 B2
(45) Date of Patent: Feb. 12, 2019

(54) DYNAMIC RESOURCE ALLOCATION WITH FORECASTING IN VIRTUALIZED ENVIRONMENTS

(71) Applicant: International Business Machines Corporation, Armonk, NY (US)

(72) Inventors: Simon J. Brady, Dublin (IE); John V. Delaney, County Meath (IE); Anthony M. Hunt, Hopewell Junction, NY (US); Claus Schrøder-Hansen, Kbh Oe (DK); Gerhard A. Widmayer, Herrenberg (DE); Clea Zolotow, Key West, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 15/410,375

(22) Filed: Jan. 19, 2017

(65) Prior Publication Data
US 2018/0203739 A1    Jul. 19, 2018

(51) Int. Cl.
G06F 9/455    (2018.01)
G06F 9/50    (2006.01)

(52) U.S. Cl.
CPC ........ *G06F 9/5077* (2013.01); *G06F 9/45558* (2013.01); *G06F 2009/4557* (2013.01)

(58) Field of Classification Search
CPC .................................................. G06F 9/45533
USPC ........................................................... 718/1
See application file for complete search history.

(56) References Cited

U.S. PATENT DOCUMENTS

| 7,752,635 B2* | 7/2010 | Lewites ................ G06F 13/385 |
| | | 717/148 |
| 9,224,147 B2* | 12/2015 | Franco ................. G06Q 30/016 |
| 9,703,591 B2* | 7/2017 | Shimogawa ........ G06F 9/45558 |
| 9,766,939 B1* | 9/2017 | Khafizov ............... G06F 9/5038 |
| 2004/0143664 A1* | 7/2004 | Usa ....................... G06F 9/5077 |
| | | 709/226 |

(Continued)

OTHER PUBLICATIONS

MacIsaac et al., "The Virtualization Cookbook for z/VM 6.2 RHEL 6.2 and SLES 11 SP2." IBM Corp., 2012.

(Continued)

*Primary Examiner* — Mehran Kamran
(74) *Attorney, Agent, or Firm* — Garg Law Firm, PLLC; William Hartwell

(57) ABSTRACT

In a virtualized data processing system where an operating system assigns resources to a virtualized computing entity (VCE) according to a container configuration of the VCE, and by using performance data corresponding to a type of the VCE, an initial resource allocation for a new VCE is computed at an initialization of the new VCE. The performance data includes at least a processor utilization information corresponding to the type of VCE for a past period. An operation of the new VCE is initiated using the initial resource allocation. New performance data is collected from the operation of the new VCE. For a future period of operation of the new VCE, a resource requirement is forecasted. An instruction to a provisioning system is constructed, specifying a portion of the resource requirement and the future period, which causes the provisioning system to adjust the initial resource allocation.

18 Claims, 5 Drawing Sheets

(56) References Cited

U.S. PATENT DOCUMENTS

| | | | | |
|---|---|---|---|---|
| 2005/0108712 | A1* | 5/2005 | Goyal | G06F 9/5083 718/100 |
| 2005/0138620 | A1* | 6/2005 | Lewites | G06F 9/45537 718/1 |
| 2007/0115916 | A1* | 5/2007 | Nguyen | H04L 41/0893 370/351 |
| 2007/0185990 | A1* | 8/2007 | Ono | G06F 11/3409 709/224 |
| 2010/0185481 | A1* | 7/2010 | Parthasarathy | G06Q 10/06 709/226 |
| 2010/0199285 | A1* | 8/2010 | Medovich | G06F 9/45533 718/104 |
| 2011/0179417 | A1* | 7/2011 | Inakoshi | G06F 9/45558 718/1 |
| 2011/0225299 | A1* | 9/2011 | Nathuji | G06F 9/5077 709/226 |
| 2012/0246638 | A1* | 9/2012 | He | G06F 9/45558 718/1 |
| 2013/0054426 | A1* | 2/2013 | Rowland | G06F 9/5011 705/27.2 |
| 2013/0232493 | A1* | 9/2013 | Kato | G06F 1/3228 718/1 |
| 2013/0318528 | A1* | 11/2013 | Hirose | G06F 9/455 718/1 |
| 2014/0019961 | A1* | 1/2014 | Neuse | G06F 9/5088 718/1 |
| 2014/0115163 | A1* | 4/2014 | Matousek | H04L 47/762 709/226 |
| 2014/0173601 | A1* | 6/2014 | Talia | G06F 9/45533 718/1 |
| 2014/0245297 | A1* | 8/2014 | Hackett | G06F 9/5077 718/1 |
| 2014/0282520 | A1* | 9/2014 | Sabharwal | G06F 9/455 718/1 |
| 2014/0282541 | A1* | 9/2014 | Perlegos | G06F 9/45558 718/1 |
| 2015/0007177 | A1* | 1/2015 | Tobo | G06F 9/45533 718/1 |
| 2015/0150118 | A1* | 5/2015 | Addepalli | G06F 12/145 726/17 |
| 2016/0070602 | A1* | 3/2016 | Shimogawa | G06F 9/45558 718/1 |
| 2016/0092252 | A1* | 3/2016 | Wagner | G06F 9/45533 718/1 |
| 2016/0154676 | A1* | 6/2016 | Wen | G06F 9/50 718/1 |
| 2016/0378532 | A1* | 12/2016 | Vincent | G06F 9/45558 718/1 |
| 2017/0235585 | A1* | 8/2017 | Gupta | G06F 9/45558 718/1 |
| 2018/0024856 | A1* | 1/2018 | Sumida | G06F 9/45558 |
| 2018/0101413 | A1* | 4/2018 | Watanabe | G06F 9/5077 |

OTHER PUBLICATIONS

Loveland et al. "Leveraging virtualization to optimize high-availability system configurations." IBM Systems Journal, vol. 47, No. 4, 2008.

Woodside et al., "The Future of Software Performance Engineering" Future of Software Engineering, 2007. FOSE'07. IEEE, 2007.

IBM, Set Share Command, Copyright IBM Corporation 1990, 2008.

IBM, IBM Opens Mainframe Linux and Cloud Center in Beijing, Center supports growth of System z Linux and cloud solution offerings in China, Jun. 2, 2014.

* cited by examiner

DYNAMIC RESOURCE ALLOCATION WITH FORECASTING IN VIRTUALIZED ENVIRONMENTS

TECHNICAL FIELD

The present invention relates generally to a method, system, and computer program product for allocating resources to virtual machines in a virtualized data processing environment. More particularly, the present invention relates to a method, system, and computer program product for dynamic resource allocation with forecasting in virtualized environment.

BACKGROUND

A virtual machine (VM) comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

For example, the host may include a processor component. One virtual representation of one portion of the capacity of the processor can be assigned to one VM, and another virtual representation of another portion of the capacity of the same processor can be assigned to another VM, both VMs executing on the host. Furthermore, the second VM may also have access to a virtual representation of a reserve processor in the host and certain other resources, either exclusively or in a similar shared manner with the first VM.

Certain data processing systems are configured to process several workloads simultaneously. For example, separate virtual data processing systems, such as separate VMs, configured on a single host data processing system often process separate workloads for different clients or applications. In large scale data processing environments, such as in a data center, thousands of VMs can be operating on a host at any given time, and hundreds if not thousands of such hosts may be operational in the data center at the time.

VMs are installed or created on a compute node as needed for processing workloads, meeting service level requirements, and many other reasons. Furthermore, different configurations of VMs may be needed for different purposes. For example, when a VM is created just for providing a user a general purpose computing platform, the VM may be created only with the basic operating system and no applications. In another example, when a new VM has to provide application services, the VM may be created with an operating system and an application server configured thereon. Similarly, many different configurations of VMs may be created for a variety of other purposes.

An image is a binary package that can be installed to instantiate a VM on the hardware. A layer is a software package that participates in an image. An image can include any number of software packages, whose layers are assembled together in the image as a monolithic binary. A single image can, but need not necessarily, represent an application.

A commonly used method of virtualization—traditional virtualization—preconfigures various VM configurations as template images (templates). When a VM having a specific predetermined configuration has to be created on a compute node, a suitable template is selected from a template storage, such as a database or a file-system, and installed on the compute node to create a VM having the desired configuration. An image of a VM in traditional virtualization is a monolithic binary image.

Another method for virtualization is container-based virtualization. Container-based virtualization, also called operating system virtualization, is an approach to virtualization in which the virtualization layer runs as an application within the operating system. In this approach, the operating system's kernel runs on the hardware node with several isolated guest VMs installed. The isolated guests are called containers.

With container-based virtualization, there isn't the overhead associated with having each guest run a completely installed operating system. This approach can also improve performance because there is just one operating system taking care of hardware calls. A disadvantage of container-based virtualization, however, is that each guest must use the same operating system the host uses.

Container-based virtualization is a way to operate several containers on the same host, where the containers share the same kernel and memory space among themselves and with the virtual machine and host. The isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

This method of virtualization is significantly different from the traditional virtualization technology where the hardware is emulated using a software emulation layer, which causes provisioning latencies, slow startup times, and decreased performance of the underlying hardware. These and other drawbacks of the traditional virtualization method are due to the software emulation layer that sits between the physical hardware of the host and the operating system that is being run on top of the emulated hardware.

The container-based virtualization technology offers higher performance and less resource footprint when compared to traditional virtualization, and has become an attractive way for cloud vendors to achieve higher density in the datacenter. Thus, containerization (i.e., operating a virtualized data processing environment using container-based virtualization) is changing how workloads are being provisioned on cloud infrastructure.

Hereinafter, a reference to a virtualized computing entity (VCE) is a reference to a VM or a container, depending upon the environment in which an embodiment is implemented. An embodiment described herein with respect to a VM can be adapted by those of ordinary skill in the art to operate in a containerized environment, and vice-versa, and such adaptations are contemplated within the scope of the illustrative embodiments.

SUMMARY

The illustrative embodiments provide a method, system, and computer program product. An embodiment includes a method that computes, in a virtualized data processing system where an operating system assigns resources to a virtualized computing entity according to a container configuration of the virtualized computing entity, and by using performance data corresponding to a type of the virtualized computing entity, an initial resource allocation for a new virtualized computing entity. The initial resource allocation may be at an initialization of the virtualized computing entity, or may be a previous resource allocation that has been reached during the operation of the virtualized computing entity and which has to be adjusted. The performance data includes at least a processor utilization information corresponding to the type of virtualized computing entity for a past period. The embodiment initiates an operation of the new virtualized computing entity using the initial resource allocation. The embodiment collects new performance data from the operation of the new virtualized computing entity. The embodiment forecasts, for a future period of operation of the new virtualized computing entity, a resource requirement. The embodiment constructs an instruction to a provisioning system, wherein the instruction specifies a portion of the resource requirement and the future period. The embodiment causes the provisioning system, responsive to the instruction, to adjust the initial resource allocation.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
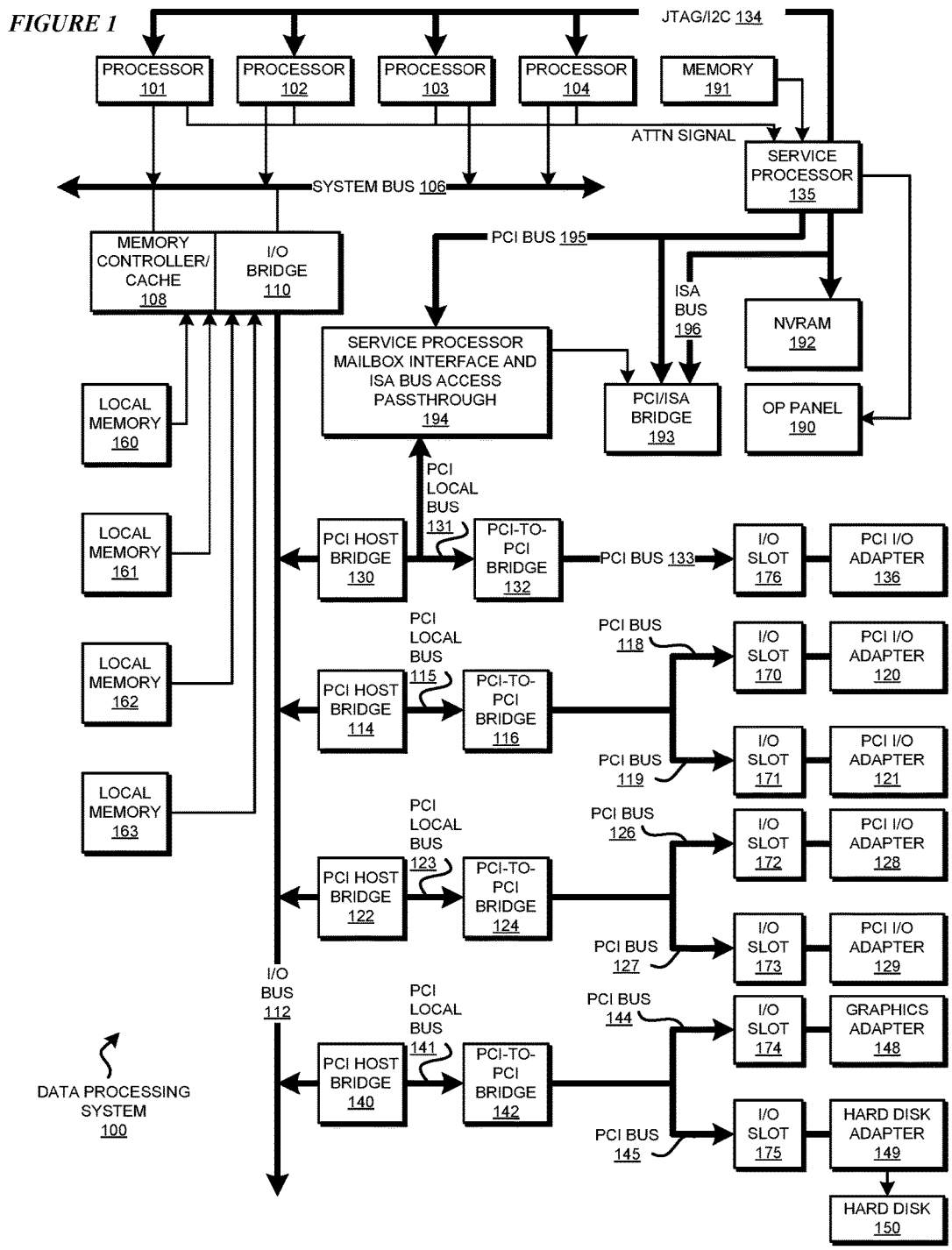
FIG. 1 depicts a block diagram of a network of data processing systems in which illustrative embodiments may be implemented.

Within the scope of the illustrative embodiments, a "container" comprises a set of hardware resources available to an operating system in such a manner that the allocation of hardware resources to the set can be controlled by an entity in either the operating system itself or outside the operating system. The illustrative embodiments provide ways to ensure that the hypervisor and a VM work together to ensure this resource allocation. In a non-limiting example configuration in which an embodiment is envisioned to operate includes a hypervisor at a top level, a VM is allocated from the hypervisor, a zLinux instance is a guest that runs in the VM; and a container can be allocated within the zLinux guest or the VM.

In the presently available container-based virtualization, slices of a physical resource are allocated to a container when the container is instantiated. For example, a VM corresponding to a container is allocated a portion of the processing cycles of a processor, a portion of the storage available in memory, a portion of a data bandwidth available in an input/output (I/O) device, or some combination of these and other physical resources.

The illustrative embodiments recognize that the presently available container-based virtualization suffers from a container sizing problem. In other words, presently, a provisioning mechanism, such as a hypervisor, configures a VM according to a predetermined container configuration. The predetermined container is configured with resource requirements that are generally indicative of the peak requirements of the resources that are expected during the operation of the VM. The requirement of a resource as configured in a container is not only indicative of the peak requirement of that resource, but also of a sufficiently generous headroom—or margin—from that peak requirement.

For example, if the VM is expected to require 100 (an arbitrary example number) processor cycles per unit of time at the peak of the VM's operation, the container may be configured with 150 (an arbitrary example number) cycles per unit of time, allowing for a 50 cycle headroom. In reality, the VM may operate for the majority of its operating time with only 10 (an arbitrary example number) processor cycles per unit of time.

The illustrative embodiments recognize that while a container can be configured in any suitable manner, once the container is configured, the resource allocation is static once the VM is provisioned according to the container. The workload of the VM on the other hand is not static, and therefore the resource requirements of the VM are also not static.

For example, the VM may need more resources than allocated during some periods of processing a workload, and the VM may need less resources than allocated during some other periods of processing the workload. Furthermore, not all workloads are the same. During the operation of a VM, the VM also performs certain background tasks that are not related to a customer or a paying entity. The VM nonetheless needs resources for the background workloads and the paying workloads. The illustrative embodiments recognize that the resource requirements for the background workloads should be treated differently from the resource requirements of the paying workloads.

The illustrative embodiments recognize that in order to be able to adjust the resource allocation of a VM while the VM is operating and processing a workload, and while taking into consideration the distinction between a background workload and a paying workload being processed by the VM, the operating system and the provisioning system—e.g. the hypervisor—have to collaborate with each other in a novel way. The collaboration requires some method of determining the nature of the VM during the VM's operation, forecasting a resource need of the VM for a future operation, computing a suitable resource allocation to meet that future need, and causing the provisioning system to dynamically change the allocation of the VM. Such a method is presently unavailable in container-based virtualized data processing environments.

The illustrative embodiments recognize that the presently available tools or solutions do not address these needs or provide adequate solutions for these needs. The illustrative embodiments used to describe the invention generally address and solve the above-described problems and other problems related to dynamic resource allocation with forecasting in virtualized environment.

An embodiment can be implemented as a software application, such as in the form of a daemon that operates at the kernel level of an operating system of a virtualized data processing system. The application implementing an embodiment can be configured as a modification of an existing hypervisor or other similar provisioning system, as a separate application that operates in conjunction with an existing hypervisor or other similar provisioning system, a standalone application, or some combination thereof. An application implementing an embodiment can also be a standalone application that operates in an operating system instance used by a container or VM, and changes certain operating system parameters for the use of hardware resources in a manner described herein.

An embodiment collects a variety of data that is usable in forecasting a VM's resource requirements. For example, a set of different types of VMs may be executing in a given virtualized data processing environment. Each type of VM may be configured for a particular type of workload. For example, one type of VM may be configured for operating a database, another type of VM may be configured for operating a webserver, another type of VM may be configured for operating a batch operation, another type of VM may be configured for operating a live interactive application, and many others types can be similarly configured.

Different VMs of different types experience different utilization profiles. For example, the type of VM configured for operating a database may experience a steady utilization throughout its operation; the type of VM configured for operating a web server may experience peak activity during a daytime period, varying levels of activity during the day, and the least amount of activity during a nighttime period; the type of VM configured for operating a batch operation may experience a steady utilization throughout the night and very low utilization during the day, the type of VM configured for operating a live interactive application may experience sporadic peaks and troughs in its utilization distributed in a seemingly random manner throughout the day. The utilization profile of a type of VM describes a pattern of usage of the VM over a period, which is indicative of a pattern of resource requirements over the period.

In some types of VMs, the resource requirements are also driven by the number of users—whether humans or other systems—connected to the VM or using the VM's service. Generally, the higher the number of users connecting in a period, the higher the resource requirement during the period.

Different VMs use different resources differently. For example, a computationally intensive VM uses the processor above a threshold measurement of usage. As another example, an I/O intensive VM may use a memory or a network interface above a threshold measurement of usage.

As a consequence, or for this reason, different VMs may rely on different settings or parameters of the operating system. For example, a processor-intensive VM may be more dependent upon a timer interrupt setting of the operating system than a network-intensive VM.

A VM may also have privileges, priority, or generally a weighting, relative to other VMs in the environment. The resource requirements of the VM are also dependent upon the VM's relative weighting. For example, when a resource has limited availability, a low weighted VM may receive a smaller slice of that resource as compared to a relatively higher weighted VM performing a comparable operation. As an example, a VM that performs more background workloads than paying workloads may be weighted less than a VM that performs more paying workloads than background workloads, even if the paying workloads of the two VMs are similar.

Using such considerations, the data collection function of an embodiment collects performance data usable in forecasting a VM's future resource requirements. Some non-limiting examples of such performance data include the utilization data of the various types of VMs, the number of user connections of the various types of VMs, the types of operations in which the VMs are used, the resource-specific dependencies or intensiveness of the various types of VMs, the operating system parameters used by or useful to the various types of VMs, the weightings of the various types of VMs, the amount of background work performed by the various types of VMs, or some combination of these and other similarly purposed data.

One embodiment uses a configuration of a container to initially allocate various resources to the VM. Another embodiment uses the performance data described herein to determine a type of VM being created, and initially allocates the resources according to the forecasted need of the VM during an initial period. The forecasting of the initial resource requirement may be based on the performance data of the same VM during a previous instantiation—e.g., the performance data of a previous use of the same container. Alternatively, the forecasting of the initial resource requirement may be based on the performance data of a different VM that is similar in some respect to the VM being created. For example, the performance data may be of a previous use of a different container.

An embodiment continues to collect the performance data of the VM once the VM begins to operate and process workloads. The embodiment also determines the operating system parameters and their values that are being used by the VM or affecting the operation of the VM. The embodiment further determines the relative weighting that the VM is using relative to other VMs operating in the environment.

One embodiment separates the workloads processed by the VM into paying workloads and background workloads. The embodiment tracks the resource utilization of the paying and background workloads separately. The embodiment adds the performance data collected from the operating VM into the repository of other performance data.

Using the VM's own performance data from the present operation, the performance data of other VMs from the repository, or a combination thereof, an embodiment applies a suitable forecasting algorithm to the time-series of the performance data to compute a forecasted requirement of a particular resource during a future period of the operation of the VM. For example, the embodiment may compute a size of the processor resource that may be needed by the VM during the future period.

An embodiment constructs an instruction that is suitable for a particular hypervisor or other comparable provisioning system that is being used in a particular implementation. The instruction is recognizable by the provisioning system as an instruction to change a resource allocation. The instruction provides to the provisioning system the information descriptive of the forecasted resource requirement and the future period. Thus, the embodiment causes the provisioning system to dynamically adjust the resource allocation of the VM such that the adjusted resource allocation provides the forecasted amount of resources to the VM during the future period.

Operating in this manner, an embodiment can continue to adjust the resource allocations of the operating VMs without stopping the VMs, dynamically in response to the operations being performed by the VM, and while the VMs continue to perform the operations. Furthermore, the adjustments are computed such that the paying workloads processed by the VM benefit from the adjusted resources more than the background workloads processed by the VM.

In one embodiment, all of the added resources in an adjustment are directed to process a paying workload. In one embodiment, all of the resources removed or reduced in an adjustment are removed from the processing of a background workload.

The manner of dynamic resource allocation with forecasting in virtualized environment described herein is unavailable in the presently available methods. A method of an embodiment described herein, when implemented to execute on a device or data processing system, comprises substantial advancement of the functionality of that device or data processing system in dynamically adjusting the allocations of the various resources to a VM while the VM continues to process the workloads and with different considerations to the resources consumed by the paying workloads and background workloads.

The illustrative embodiments are described with respect to certain types of virtualization, performance data, forecasts, resources, resource requirements, adjustments, types of VMs, types of workloads, periods, utilizations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
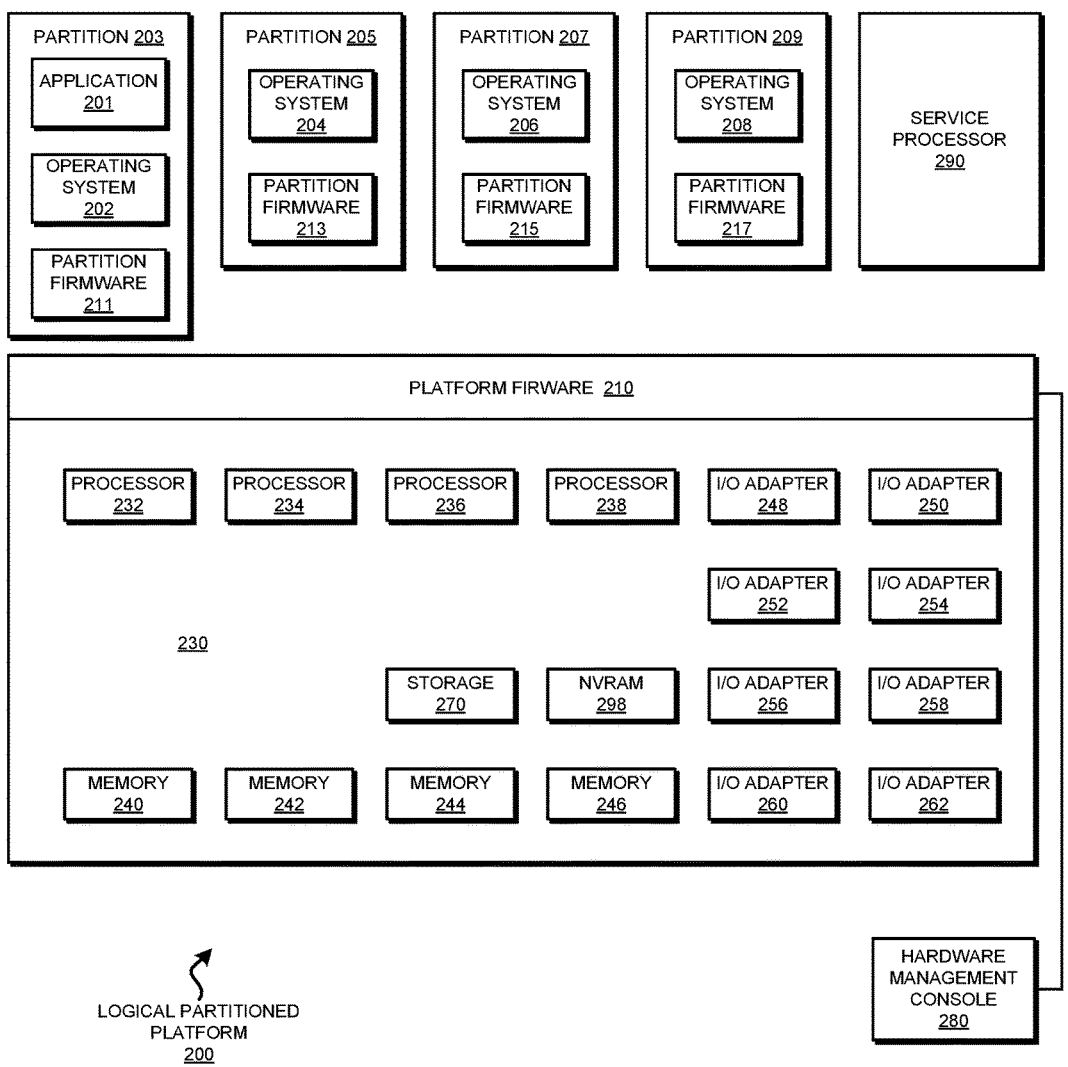
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of an example data processing system in which the illustrative embodiments may be implemented. Data processing system 100 may be, for example, a symmetric multiprocessor (SMP) system including a plurality of processors 101, 102, 103, and 104, which connect to system bus 106. For example, data processing system 100 may be an IBM Power System® implemented as a server within a network. (IBM and Power Systems are trademarks of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted Into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. As another example, some physical resources, such as adapters, can be virtualized into corresponding virtual resources (not shown), and the virtual resources can then be allocated to the various partitions. As another example, the hardware depicted in FIG. 1 can be configured to use one or more virtual I/O server (VIOS) (not shown). The VIOS allows the sharing of physical resources, such as adapters, disks, controllers, processors, memories, and the like, between the supported logical partitions. Among other functions, between partitions, a shared VIOS helps reduce the need for large amounts of cabling, and perform live migration. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. Operating systems 202, 204, 206, and 208 are located in partitions 203, 205, 207, and 209, respectively.

These operating systems may interface with a partition management firmware, such as Hypervisor. Hypervisor software is an example of software that may be used to implement partition management firmware 210. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

Partition 203 includes application 201, which implements an embodiment described herein. Application 201 may operate to dynamically adjust the resource allocation of VMs that operation on partition 203 or other partitions depending on the provisioning system used, such as Hypervisor implemented as partition management firmware 210. Furthermore, the code of application 201 may be downloaded over a data network from a remote system where similar code is stored on a storage device. In another case, the code of application 201 may be downloaded over the data network to a remote system where the downloaded code is stored on a storage device.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208. CPUs, memory, or NVRAM also may be shared between partitions that use or access them sequentially. I/O adapters may be assigned to a virtual I/O server to enable sharing of I/O bandwidth between partitions.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing at least some of the hardware resources of logically partitioned platform 200.

Service processor 290 may be used to provide various services, such as processing of platform errors in the partitions. These services also may act as a service agent to report errors back to another system. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
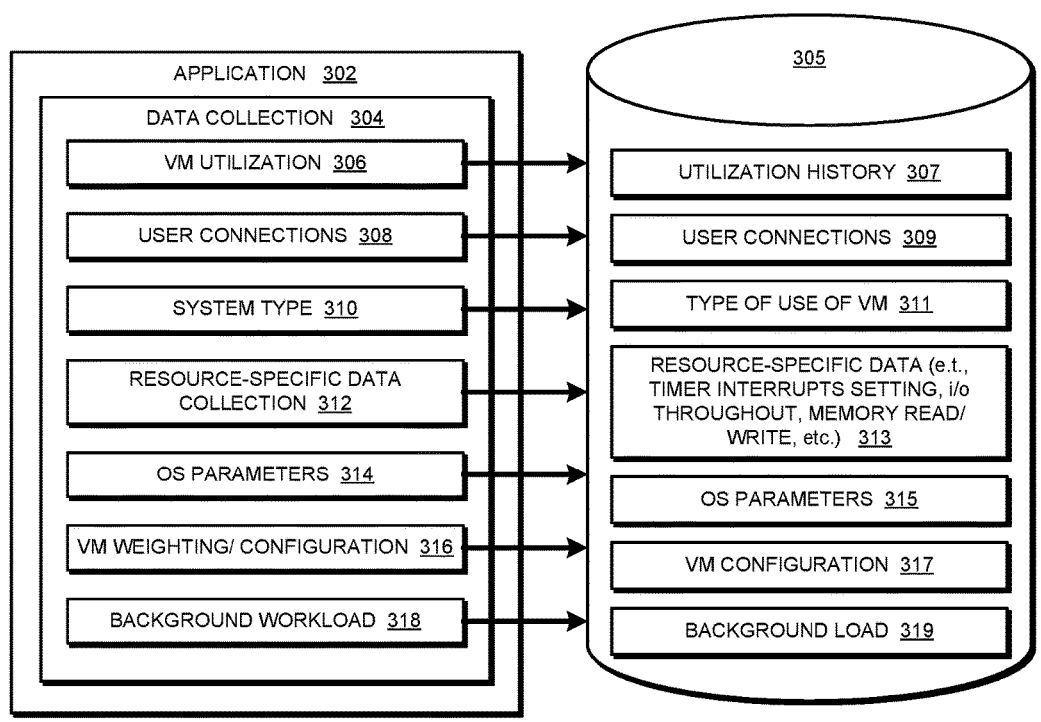
FIG. 3 depicts a block diagram of an example configuration for dynamic resource allocation with forecasting in virtualized environment in accordance with an illustrative embodiment.

With reference to FIG. 3, this figure depicts a block diagram of an example configuration for dynamic resource allocation with forecasting in virtualized environment in accordance with an illustrative embodiment. Application 302 is an example of application 201 in FIG. 2.

Data collection component 304 collects the performance data of a set of types of VMs operating in the environment. The performance data is collected in repository 305. For example, subcomponent 306 collects VM utilization history 307 of the various VMs; subcomponent 308 collects number of user connections 309 of the various VMs; subcomponent 310 collects types of use 311 of the various VMs.

Similarly, subcomponent 312 determines the various resource-specific data 313 that is to be collected for the various resources used in the various VMs and collects data 313. Subcomponent 314 determines the various OS parameters 315 that affect the usage of the various resources used in the various VMs and collects data 315. When the VMs are configured with weights in the environment, subcomponent 316 collects weighting or VM configuration data 317.

Subcomponent 318 determines data 319 which is indicative of the types and amounts of background loads processed by the various VMs. Data 319 is usable in estimating an amount of background workload processed by a VM whose resources are dynamically adjusted as described herein.

Figure 4:
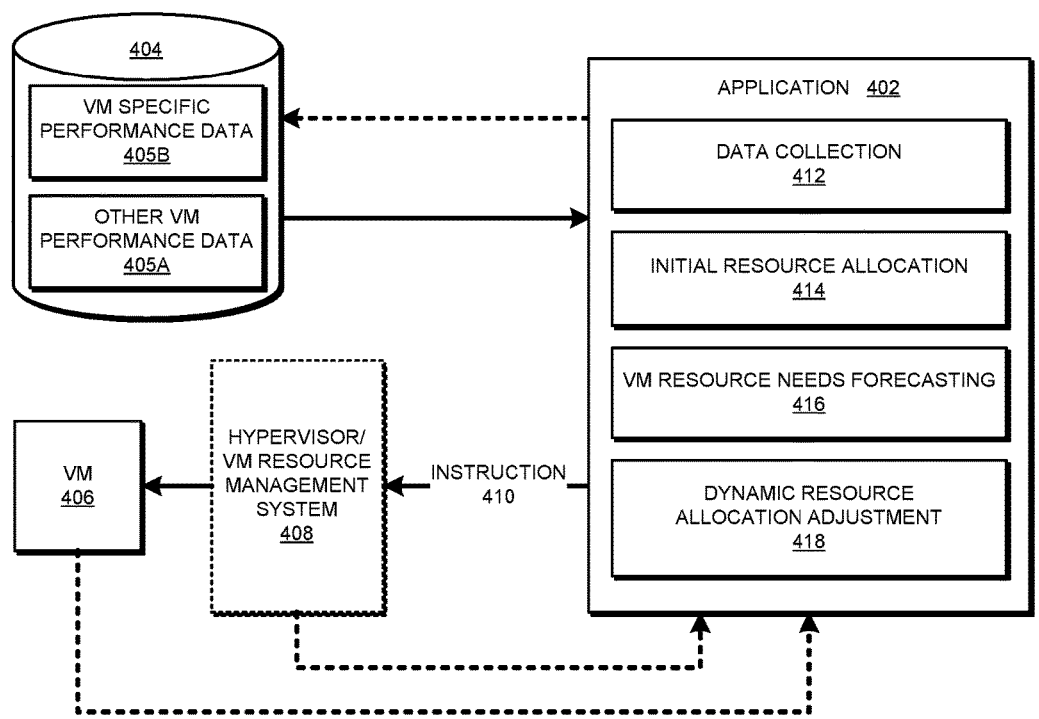
FIG. 4 depicts a block diagram of an example configuration for dynamic resource allocation with forecasting in virtualized environment in accordance with an illustrative embodiment.

With reference to FIG. 4, this figure depicts a block diagram of an example configuration for dynamic resource allocation with forecasting in virtualized environment in accordance with an illustrative embodiment. Application 402 is an example of application 302 in FIG. 3. Repository 404 is an example of repository 305 in FIG. 3. Other VM performance data 405A includes some or all of data 307, 309, 311, 313, 315, 317, 319, other similarly purposed data as described herein, or some combination thereof.

Suppose that VM 406 is a VM whose resource allocations are to be dynamically managed as described herein. Hypervisor 408 or another provisioning system comparable to hypervisor 408 adjusts the resources of VM 406 using instruction 410 in a manner described herein.

For example, component 412 is an example of component 304 in FIG. 3, and collects other VM performance data 405A as described herein. When VM 406 is operating, component 412 collects VM-specific performance data 405B from the operating system, hypervisor 408, and VM 406 itself. When VM 406 is initially configured, component 414 instructs hypervisor 408 to allocate an initial amount of a resource. Component 414 computes the initial resource allocation in a manner described herein.

While VM 406 is operating, component 416 applies a forecasting algorithm to performance data 405A, 405B, or both, to compute a resource need of VM 406 during a future period of VM 406's operation. Component 418 constructs allocation adjustment instruction 410 using the forecasted resource needs, and transmits instruction 410 to hypervisor 408. Hypervisor 408 has been modified to understand instruction 410, and change a resource allocation of VM 406 to satisfy the forecasted resource need for the future period, both of which are specified in instruction 410.

Figure 5:
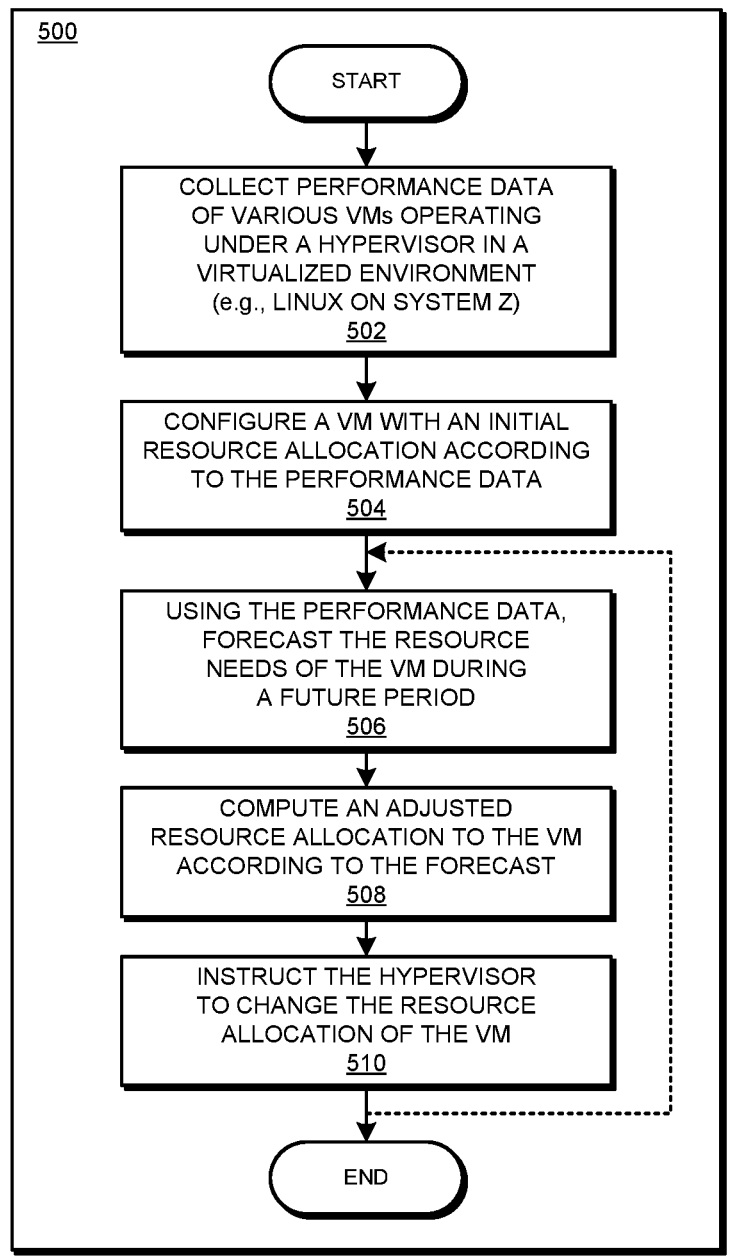
FIG. 5 depicts a flowchart of an example process for dynamic resource allocation with forecasting in virtualized environment in accordance with an illustrative embodiment.

With reference to FIG. 5, this figure depicts a flowchart of an example process for dynamic resource allocation with forecasting in virtualized environment in accordance with an illustrative embodiment. Process 500 can be implemented in application 402 in FIG. 4.

The application collects performance data of various VMs operating under a hypervisor or similar provisioning system operating in a virtualized environment, for example in a Linux based system Z environment (block 502). The application configures a VM with an initial resource allocation according to the performance data (block 504).

The application uses the performance data to forecast the resource needs of the VM during a future period (block 506). The application computes an adjustment to the resource allocation that should be made to the VM for the forecasted period (block 508). The application instructs the hypervisor or a comparable provisioning system to change the allocation of the resources to the VM during the forecasted period (block 510). The application may end process 500 thereafter or return to block 506 for another forecasting.

Thus, a computer implemented method, system or apparatus, and computer program product are provided in the illustrative embodiments for dynamic resource allocation with forecasting in virtualized environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    collecting, in a virtualized data processing system wherein an operating system assigns resources to a virtualized computing entity according to a container configuration, performance data corresponding to a type of the virtualized computing entity, wherein the performance data includes at least a processor utilization information corresponding to the type of the virtualized computing entity for a past period, wherein a subset of virtualized computing entities is of the type, and wherein a new virtualized computing entity is of a different type having a different utilization profile from the type, and wherein the type and the different type have at least one aspect of virtualized computing entities in common;
    computing, by using collected performance data, an initial resource allocation for a new virtualized computing entity
    initiating an operation of the new virtualized computing entity using the initial resource allocation;
    collecting new performance data from the operation of the new virtualized computing entity;
    forecasting, for a future period of operation of the new virtualized computing entity, a resource requirement;
    constructing an instruction to a provisioning system, wherein the instruction specifies a portion of the resource requirement and the future period; and
    causing the provisioning system, responsive to the instruction, to adjust the initial resource allocation.

2. The method of claim 1, wherein the provisioning system is a hypervisor.

3. The method of claim 1, further comprising:
    determining a first portion of the resource requirement during the future period, wherein the first resource requirement is forecasted for use with a paying workload at the new virtualized computing entity during the future period;
    determining a second portion of the resource requirement during the future period, wherein the second resource requirement is forecasted for use with a background workload at the new virtualized computing entity during the future period; and
    using the first portion as the portion in the instruction.

4. The method of claim 1, wherein the type of the virtualized computing entity comprises a type of application for which the virtualized computing entity is used.

5. The method of claim 1, further comprising:
    collecting, as a part of the performance data, a resource-specific information, wherein the resource-specific information is a value configured in the operating system, the value causing a limitation on allocating a processor to virtualized computing entities operating in the virtualized data processing system.

6. The method of claim 5, wherein the resource-specific information is a timer interrupt setting.

7. The method of claim 1, further comprising:
    collecting, as a part of the performance data, a resource-specific information, wherein the resource-specific information is a value configured in the operating system, the value causing a limitation on allocating a memory to virtualized computing entities operating in the virtualized data processing system.

8. The method of claim 7, wherein the resource-specific information is an input/output throughput specification.

9. A computer usable program product comprising one or more computer-readable storage devices, and program instructions stored on at least one of the one or more storage devices, the stored program instructions comprising:
    program instructions to collect, in a virtualized data processing system wherein an operating system assigns resources to a virtualized computing entity according to a container configuration of the virtualized computing entity, performance data corresponding to a type of the virtualized computing entity, wherein the performance data includes at least a processor utilization information corresponding to the type of the virtualized computing entity for a past period, wherein a subset of virtualized computing entities is of the type, and wherein a new virtualized computing entity is of a different type having a different utilization profile from the type, and wherein the type and the different type have at least one aspect of virtualized computing entities in common;

program instructions to compute, by using collected performance data, an initial resource allocation for a new virtualized computing entity, program instructions to initiate an operation of the new virtualized computing entity using the initial resource allocation;

program instructions to collect new performance data from the operation of the new virtualized computing entity;

program instructions to forecast, for a future period of operation of the new virtualized computing entity, a resource requirement;

program instructions to construct an instruction to a provisioning system, wherein the instruction specifies a portion of the resource requirement and the future period; and program instructions to cause the provisioning system, responsive to the instruction, to adjust the initial resource allocation.

10. The computer usable program product of claim 9, wherein the provisioning system is a hypervisor.

11. The computer usable program product of claim 9, further comprising:

program instructions to determine a first portion of the resource requirement during the future period, wherein the first resource requirement is forecasted for use with a paying workload at the new virtualized computing entity during the future period;

program instructions to determine a second portion of the resource requirement during the future period, wherein the second resource requirement is forecasted for use with a background workload at the new virtualized computing entity during the future period; and program instructions to use the first portion as the portion in the instruction.

12. The computer usable program product of claim 9, wherein the type of the virtualized computing entity comprises a type of application for which the virtualized computing entity is used.

13. The computer usable program product of claim 9, further comprising:

program instructions to collect, as a part of the performance data, a resource-specific information, wherein the resource-specific information is a value configured in the operating system, the value causing a limitation on allocating a processor to Virtualized computing entities operating in the virtualized data processing system.

14. The computer usable program product of claim 13, wherein the resource-specific information is a timer interrupt setting.

15. The computer usable program product of claim 9, further comprising:

program instructions to collect, as a part of the performance data, a resource-specific information, wherein the resource-specific information is a value configured in the operating system, the value causing a limitation on allocating a memory to Virtualized computing entities operating in the virtualized data processing system.

16. The computer usable program product of claim 9, wherein computer usable code is stored in a computer readable storage device in a data processing system, and wherein the computer usable code is transferred over a network from a remote data processing system.

17. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to collect, in a virtualized data processing system wherein an operating system assigns resources to a virtualized computing entity according to a container configuration of the virtualized computing entity, performance data corresponding to a type of the virtualized computing entity, wherein the performance data includes at least a processor utilization information corresponding to the type of the virtualized computing entity for a past period, wherein a subset of virtualized computing entities is of the type, and wherein a new virtualized computing entity is of a different type having a different utilization profile from the type, and wherein the type and the different type have at least one aspect of virtualized computing entities in common;

program instructions to compute, by using collected performance data, an initial resource allocation for a new virtualized computing entity, program instructions to initiate an operation of the new virtualized computing entity using the initial resource allocation;

program instructions to collect new performance data from the operation of the new virtualized computing entity;

program instructions to forecast, for a future period of operation of the new virtualized computing entity, a resource requirement;

program instructions to construct an instruction to a provisioning system, wherein the instruction specifies a portion of the resource requirement and the future period; and program instructions to cause the provisioning system, responsive to the instruction, to adjust the initial resource allocation.

* * * * *